United States Patent
Lin et al.

(10) Patent No.: US 9,288,420 B2
(45) Date of Patent: Mar. 15, 2016

(54) METHOD AND SYSTEM FOR RECEPTION OF DIGITAL TELEVISION SIGNAL

(71) Applicant: AIROHA TECHNOLOGY CORP., Hsinchu (TW)

(72) Inventors: Heng-Chih Lin, Hsinchu (TW); Yu-Hua Liu, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 115 days.

(21) Appl. No.: 14/183,661

(22) Filed: Feb. 19, 2014

(65) Prior Publication Data
US 2015/0181150 A1 Jun. 25, 2015

(30) Foreign Application Priority Data
Dec. 25, 2013 (TW) .............................. 102148301 A

(51) Int. Cl.
*H04N 5/455* (2006.01)
*H04N 5/44* (2011.01)
*H04H 40/18* (2008.01)

(52) U.S. Cl.
CPC ................ *H04N 5/44* (2013.01); *H04H 40/18* (2013.01); *H04N 5/455* (2013.01)

(58) Field of Classification Search
CPC .................................. H04N 5/44; H04N 5/455
USPC ......................................................... 348/726
See application file for complete search history.

(56) References Cited

U.S. PATENT DOCUMENTS

| | | | |
|---|---|---|---|
| 6,236,840 B1 * | 5/2001 | Aihara et al. | 455/83 |
| 6,980,611 B1 * | 12/2005 | Marino, Jr. | 375/346 |
| 2006/0009171 A1 | 1/2006 | Xu et al. | |
| 2011/0122975 A1 * | 5/2011 | Umeda et al. | 375/319 |
| 2014/0171007 A1 * | 6/2014 | Nentwig et al. | 455/317 |
| 2014/0269863 A1 * | 9/2014 | Fan et al. | 375/221 |

FOREIGN PATENT DOCUMENTS

EP 1063767 A2 12/2000

* cited by examiner

*Primary Examiner* — Michael Lee
(74) *Attorney, Agent, or Firm* — Rosenberg, Klein & Lee

(57) ABSTRACT

The present invention provides a digital television signal reception system, comprising a chip having a low-noise amplifier and a master receiver, at least one slave receiver, and at least one local-oscillator leakage processing unit. The chip receives at least one digital input signal of television channel. The low-noise amplifier amplifies and sends the input signal of television channel to the master/slave receiver. The input signal of television channel is frequency-mixed by the master/slave receiver so as to output an output signal of second television channel and an output signal of second television channel. The local-oscillator leakage processing unit detects and removes local-oscillator leakage of the master receiver included in the output signal of second television channel, so as to avoid interference of the local leakage of master receiver on sensitivity of receiving the output signal of second television channel of slave receiver by the slave television.

10 Claims, 7 Drawing Sheets

METHOD AND SYSTEM FOR RECEPTION OF DIGITAL TELEVISION SIGNAL

FIELD OF THE INVENTION

The present invention is related to a method and system for reception of digital television signal, particularly to a method and system for reception of digital television signal capable of detecting and removing local-oscillator leakage.

BACKGROUND

As technology progresses with the condition of chasing after higher video quality of television by users, a digital television signal reception system has been popularized gradually.

Referring to FIG. 1, there is shown a configuration diagram of a conventional digital television signal reception system. As illustrated in the figure, the digital television signal reception system 100 is a system for receiving wireless digital input signal of television channel, the system 100 comprising a low-noise amplifier (LNA) 13, a master receiver 14 and at least one slave receiver 15.

The low-noise amplifier 13 is allowed to receive a down-converted digital input signal of television channel (S-in) via an antenna 11 and a low-noise down converter 12, and amplify the input signal of television channel (S-in) with a constant gain so as to send the amplified input signal of television channel (S-in) to the master receiver 14 and the slave receiver 15, respectively.

The master receiver 14 comprises a first low-noise amplifier 141, a first frequency mixer 142 and a first local oscillator source 143. The master receiver 14 is allowed for fine tuning the gain of the first low-noise amplifier 141, such that the input signal of television channel (S-in) may be amplified again by the first low-noise amplifier 141 with suitable gain. Afterwards, the first frequency mixer 142 is allowed for frequency-mixing the input signal of television channel (S-in) with the first local oscillator source ($LO_1$) 143, so as to generate an output signal of first television channel (S-out1). Then, visual content of television program may be watched through a master television connected to the master receiver 14 by playing the output signal of first television channel (S-out1).

Additionally, the slave receiver 15 comprises a second low-noise amplifier 151, a second frequency mixer 152 and a second local oscillator source 153. The slave receiver 15 is allowed for fine tuning the gain of the second low-noise amplifier 151, such that the input signal of television channel (S-in) may be amplified again by the second low-noise amplifier 151 with suitable gain. Afterwards, the second frequency mixer 152 is allowed for frequency-mixing the input signal of television channel (S-in) with the second local oscillator source ($LO_2$) 153, so as to generate an output signal of second television channel (S-out2). Then, visual content of television program may be watched through a slave television connected to the slave receiver 15 by playing the output signal of second television channel (S-out2). In this case, multiple receivers 14, 15 are provided in the digital television signal reception system 100, such that video of television program may be played for multiple television sets.

In the past, the two receivers 14, 15 are designed as chip components provided with internal low-noise amplifiers 141, 151, respectively, so as to avoid local-oscillator leakage existed between the master receiver 14 and the slave receiver 15. For instance, the first local oscillator source ($LO_1$) 143 of the master receiver 14 is improbable to be leaked to the slave receiver 15 due to isolation of the first low-noise amplifier 141, such that interference of local-oscillator leakage of the master receiver 14 on sensitivity of receiving input signal of television channel via the slave receiver 15 is avoided.

Accordingly, although local-oscillator leakage may be avoided if the two receivers 14, 15 are designed as chip components provided with internal low-noise amplifiers 141, 151, respectively, input signal of television channel must be amplified in two stages with the external low-noise amplifier 13 and the internal low-noise amplifiers 141/151. Then, in the digital television signal reception system 100, multiple low-noise amplifiers 13, 141, 151 may be provided, further increasing much area for circuit layout. Furthermore, the gain of the external low-noise amplifier 13 is often just fixed at a smaller gain (such as, below 5 db), to avoid the input signal of television channel (S-in), amplified by the external low-noise amplifier 13, unable to meet the requirement for linearity. Thereby, it is still possible for a weak input signal of television channel (S-in) unable to meet the requirement of the reception system 100 for signal intensity, even if two-stage amplification is performed thereon.

SUMMARY OF THE INVENTION

It is one object of the present invention to provide a digital television signal reception system, which comprises a chip having a low-noise amplifier and a master receiver, as well as at least one slave receiver, said one single low-noise amplifier being used for amplifying input signal of television channel to be sent to the master receiver and the slave receiver desirably, whereby the number of signal amplifying elements provided in the digital television signal reception system is reduced effectively, thereby reducing area for circuit layout.

It is one object of the present invention to provide a digital television signal reception system, in which the low-noise amplifier is integrated into the chip of the master receiver, such that the gain of the low-noise amplifier may be then regulated by the master receiver or the slave receiver directly on the basis of requirement for signal intensity. In this connection, the gain of the low-noise amplifier is capable of being adjusted with a larger multiplying factor, so as to provide an input signal of television channel conforming to the requirement for signal intensity desired by the master receiver and the slave receiver.

It is one object of the present invention to provide a digital television signal reception system, in which digital processing method is used for detecting and removing local leakage of master receiver included in the output signal of television channel outputted from the slave receiver, so as to avoid interference of the local leakage of master receiver on sensitivity of receiving the output signal of television channel of slave receiver by the slave television, and effect on visual quality when the output signal of television channel is played.

To achieve above objects, the present invention provides a method for reception of digital television signal applied in a digital television signal reception system, the digital television signal reception system comprising a chip having a low-noise amplifier and a master receiver, at least one slave receiver, and at least one local-oscillator leakage processing unit, the steps of the method comprising: receiving at least one digital input signal of television channel by the chip; amplifying the input signal of television channel by means of the low-noise amplifier; sending the amplified input signal of television channel to the master receiver and the slave receiver; frequency-mixing the input signal of television channel with a first local oscillator source by means of the master receiver, so as to generate an output signal of first television channel; frequency-mixing the input signal of television channel with a second local oscillator source by means of the slave receiver, so as to generate an output signal of second television channel; and detecting and removing local-oscillator leakage of the master receiver included in the output signal of second television channel by a local-oscillator leakage processing unit by means of a digital processing method.

In one embodiment of the present invention, wherein the digital processing method comprises the steps of: performing a Fourier Transformation procedure, so as to transform the output signal of second television channel including local leakage in time domain into that in frequency domain; performing an averaging procedure, so as to cancel out the output signal of second television channel by averaging to obtain the local leakage only; and performing a filtering procedure on the output signal of second television channel on the basis of frequency information of the local leakage, so as to remove the local leakage from the output signal of second television channel.

In one embodiment of the present invention, wherein the digital processing method comprises the steps of: demodulating the output signal of second television channel including local leakage, so as to generate a demodulated signal; comparing the demodulated signal with a sample signal, so as to generate a differential signal; and subtracting the differential signal from the input signal of television channel, such that the local leakage is removed from the output signal of second television channel.

In one embodiment of the present invention, wherein the digital processing method comprises the steps of: setting an audio test signal; frequency-sweeping the output signal of second television channel by means of the audio test signal, so as to obtain the local-oscillator leakage matching with the audio test signal; and performing a filtering procedure on the output signal of second television channel on the basis of frequency information of the local leakage, so as to remove the local leakage from the output signal of second television channel.

The present invention another provides a digital television signal reception system, comprising: a chip, used for receiving at least one digital input signal of television channel, comprising: a low-noise amplifier, used for amplifying the input signal of television channel; and a master receiver, connected to the output end of the low-noise amplifier, frequency-mixing the input signal of television channel with a first local oscillator source by means of a first frequency mixer, so as to generate an output signal of first television channel; at least one slave receiver, connected to the output end of the low-noise amplifier, frequency-mixing the input signal of television channel with a second local oscillator source by means of a second frequency mixer, so as to generate an output signal of second television channel; and at least one local-oscillator leakage processing unit, connected to the slave receiver, for detecting and removing local-oscillator leakage of the master receiver included in the output signal of second television channel.

In one embodiment of the present invention, wherein the local-oscillator leakage processing unit comprises: a fast Fourier averaging unit, receiving the output signal of second television channel including the local leakage from the slave receiver, performing a Fourier Transformation procedure so as to transform the output signal of second television channel including the local leakage in time domain into that in frequency domain, further performing an averaging procedure so as to cancel out the output signal of second television channel by averaging to obtain the local leakage only; and a filtering unit, connected to the fast Fourier averaging unit and the slave receiver, for receiving the output signal of second television channel including the local leakage via the slave receiver, as well as obtaining the local leakage via the fast Fourier averaging unit, performing a filtering procedure on the output signal of second television channel on the basis of frequency information of the local leakage so as to remove the local leakage from the output signal of second television channel.

In one embodiment of the present invention, wherein the local-oscillator leakage processing unit comprises: a demodulation unit, receiving the output signal of second television channel including the local leakage via the slave receiver, demodulating the output signal of second television channel including the local leakage so as to generate a demodulated signal; a comparator unit, connected to the demodulation unit, being provided with a sample signal, comparing the demodulated signal with the sample signal to generate a differential signal; and an adder, connected to the comparator unit and the slave receiver, receiving the output signal of second television channel including the local leakage via the slave receiver and obtaining the differential signal via the comparator unit, subtracting the differential signal from the output signal of second television channel including the local leakage such that the local leakage is removed from the output signal of second television channel.

In one embodiment of the present invention, wherein the local-oscillator leakage processing unit comprises: a frequency-sweeping unit, receiving the output signal of second television channel including the local leakage via the slave receiver, setting an audio test signal, frequency-sweeping the output signal of second television channel by means of the audio test signal so as to obtain the local leakage matching with the audio test signal from the output signal of second television channel; and a filtering unit, connected to the frequency-sweeping unit and the slave receiver, receiving the output signal of second television channel including the local leakage via the slave receiver and obtaining the local leakage via the frequency-sweeping unit, performing a filtering procedure on the output signal of second television channel on the basis of frequency information of the local leakage, so as to remove the local leakage from the output signal of second television channel.

In one embodiment of the present invention, wherein the local-oscillator leakage of the master receiver is leaked to the low-noise amplifier and the slave receiver from the master receiver.

In one embodiment of the present invention, wherein the digital input signal of television channel is a signal conforming to DVB-S, ATSC, ISDB-S, or other digital television broadcast standards.

DETAILED DESCRIPTION

Figure 1:
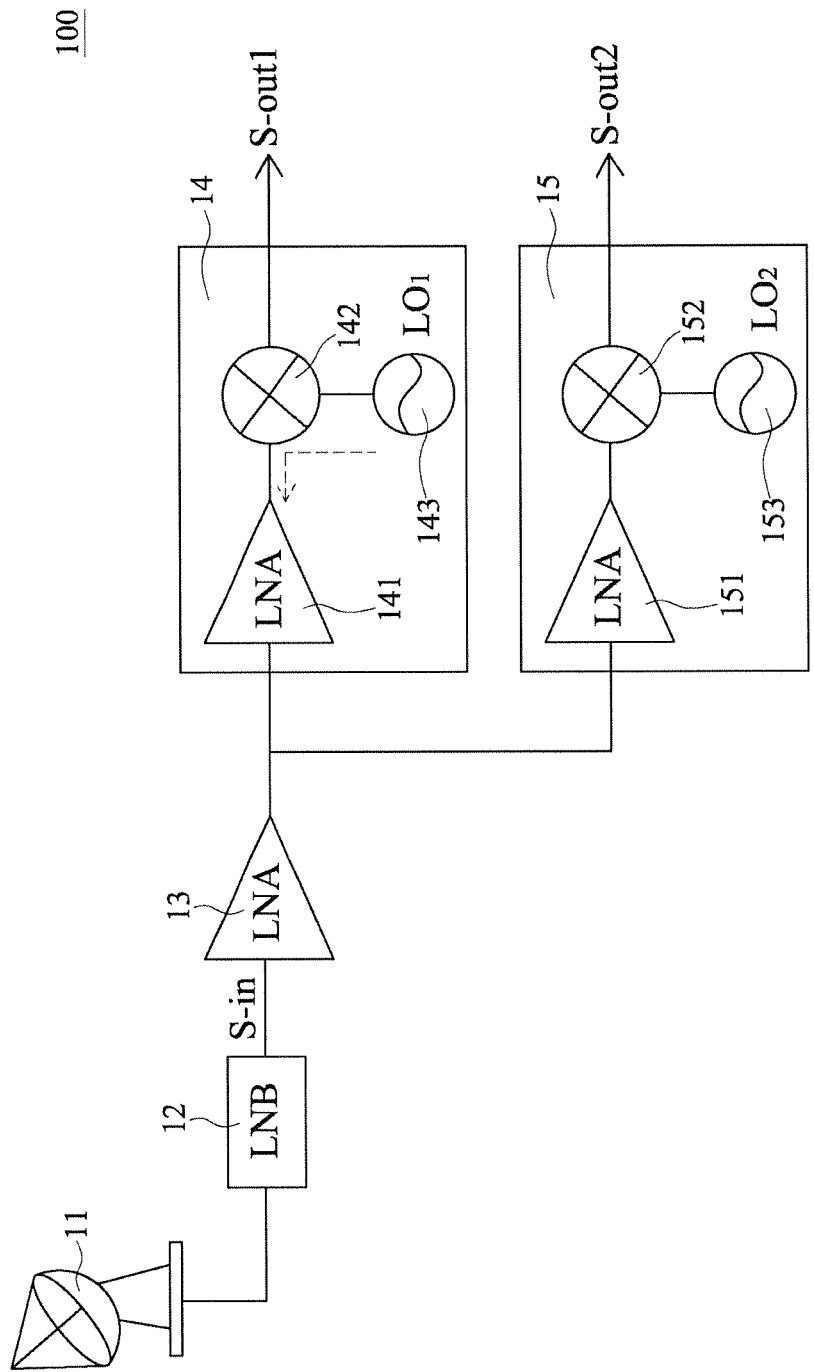
FIG. 1 is a configuration diagram of a conventional digital television signal reception system.
Figure 2:
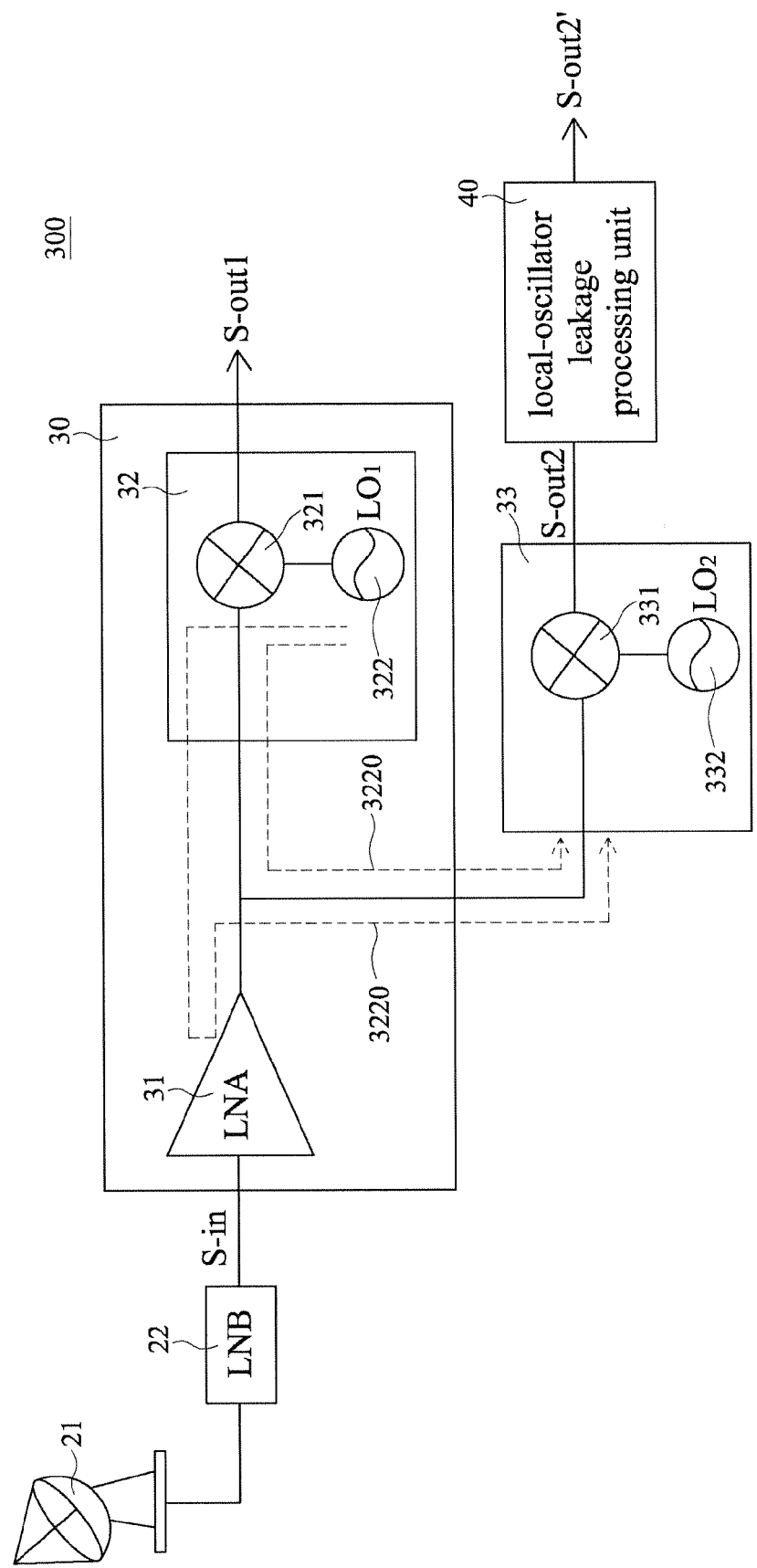
FIG. 2 is a configuration diagram of a digital television signal reception system according to one preferred embodiment of the present invention.

Referring to FIG. 2, there is shown a configuration diagram of a digital television signal reception system according to one preferred embodiment of the present invention. As illustrated in the figure, the digital television signal reception system 300 comprises a chip 30 and at least one slave receiver 33. The chip 30 comprises a low-noise amplifier 31 and a master receiver 32.

A down-converted digital input signal of television channel (S-in) may be received by the chip 30 via an antenna 11 and a low-noise down converter 12. This digital input signal of television channel (S-in) is a signal conforming to DVB-S, ATSC, ISDB-S or other digital television broadcast standards. The low-noise amplifier 31 is used for amplifying the input signal of television channel (S-in), and then sending the amplified input signal of television channel (S-in) to the master receiver 32 and the slave receiver 33, respectively.

The master receiver 32 comprises a first frequency mixer 321 and a first local oscillator source 322. The first frequency mixer 321 is connected to the output end of the low-noise amplifier 31 and the first local oscillator source 322. After the amplified input signal of television channel (S-in) is received from the low-noise amplifier 31 by the first frequency mixer 321, the input signal of television channel (S-in) and the first local oscillator source 322 are frequency-mixed thereby, so as to output an output signal of first television channel (S-out1). Then, a master television connected to the master receiver 32 is allowed to display the visual content of television program by playing the output signal of first television channel (S-out1).

Additionally, the slave receiver 33 comprises a second frequency mixer 331 and a second local oscillator source 332. The second frequency mixer 331 is connected to the output end of the low-noise amplifier 31 and the second local oscillator source 332. After the amplified input signal of television channel (S-in) is received from the low-noise amplifier 31 by the second frequency mixer 331, the input signal of television channel (S-in) and the second local oscillator source 332 are frequency-mixed thereby, so as to output an output signal of second television channel (S-out2). Then, a slave television connected to the slave receiver 33 is allowed to display the visual content of television program by playing the output signal of second television channel (S-out2).

In this case, one single low-noise amplifier 31 is used by the digital television signal reception system 300 of the present invention to amplify the input signal of television channel (S-in) to be sent to the master receiver 32 and the slave receiver 33 desirably, so as to reduce the number of signal amplifying elements provided in the digital television signal reception system 300 effectively, and thus the area for circuit layout. Furthermore, the low-noise amplifier 31 is integrated into the chip 30 of the master receiver 32, such that the gain of the low-noise amplifier 31 may be regulated by the master receiver 32 or the slave receiver 33 directly in accordance with the requirement for signal intensity, resulting in the adjustment of gain of the low-noise amplifier 31 with a higher multiplying factor (such as, above 10 db). Thus, an input signal of television channel (S-in) conforming to the requirement for signal intensity desired by the master receiver 32 and the slave receiver 33 is provided.

Although the advantage of reduction in area for circuit may be obtained through the use of one single low-noise amplifier 31 for amplifying the input signal of television channel (S-in) in the digital television signal reception system 300 of the present invention, the first local oscillator source 322 of the master receiver 32 is liable to be leaked to the output end of the low-noise amplifier 31 and the slave receiver 33 through the power-supply circuit, grounding circuit, or gain control circuit. In this connection, local leakage 3220 is often included in the output signal of second television channel (S-out2) outputted from the slave receiver 33. The sensitivity of receiving the output signal of second television channel (S-out2) by the slave television may be affected by this local leakage 3220.

Figure 3A:
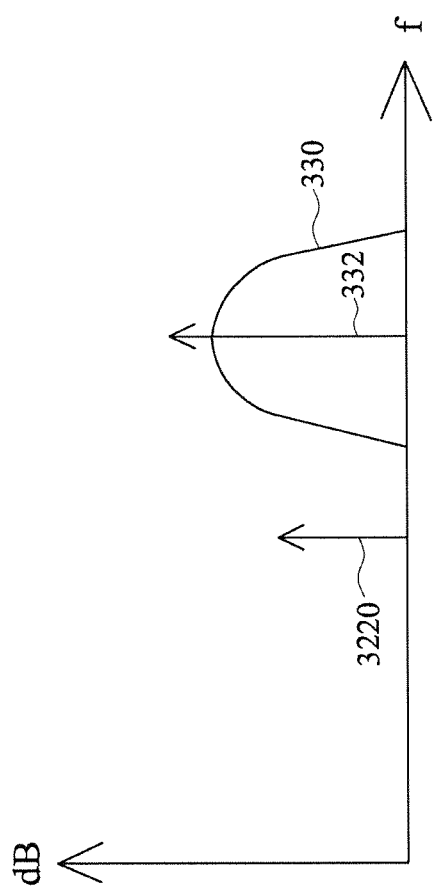
FIG. 3A is a spectrum diagram of the output signal of second television channel outputted from the slave receiver when different programs of channels are watched via the master receiver and the slave receiver of the present invention.
Figure 3B:
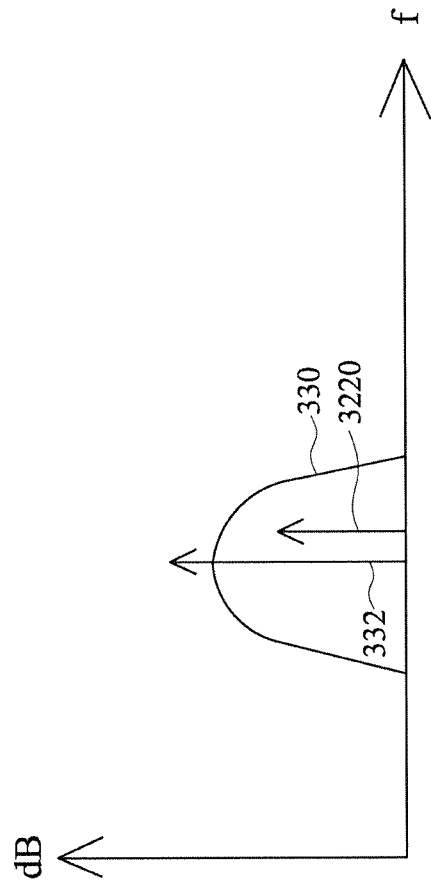
FIG. 3B is a spectrum diagram of the output signal of second television channel outputted from the slave receiver when the same program of channel is watched via the master receiver and the slave receiver of the present invention.

Referring to FIGS. 3(A) and 3(B), there are shown a spectrum diagram of the output signal of second television channel outputted from the slave receiver when different programs of channels are watched, and a spectrum diagram of the output signal of second television channel outputted from the slave receiver when the same program of channel is watched, respectively, via the master receiver and the slave receiver of the present invention. As illustrated in the figures, the slave receiver 33 is used for receiving the input signal of television channel (S-in) from the low-noise amplifier 31, and frequency-mixing the input signal of television channel (S-in) with the second local oscillator source 332 to generate a frequency spectrum of output signal of second television channel 330. The central frequency of this frequency spectrum of output signal of second television channel 330 may be also used as the signal tone of the second local oscillator source 332.

As illustrated in FIG. 3(A), the signal tone of the local leakage 3220 of the master receiver 32 may be situated outside of the frequency spectrum of output signal of second television channel 330 of the slave receiver 33, if the input signals of television channels of different programs of channels are received by the slave receiver 33 and the master receiver 32, respectively. In this case, the output signal of second television channel (S-out2) may be not interfered by the local leakage 3220. Then, the output signal of second television channel (S-out2) may be played by the slave television normally.

On the contrary, as illustrated in FIG. 3(B), the signal tone of the local leakage 3220 of the master receiver 32 may be situated inside of the frequency spectrum of output signal of second television channel 330 of the slave receiver 33 so as to affect the output signal of second television channel (S-out2), if the same program of channel is received by the slave receiver 33 and the master receiver 32. Thus, the output signal of second television channel (S-out2) with poor video quality may be played by the slave television.

Subsequently, referring to FIG. 2 again, a local-oscillator leakage processing unit 40 is provided at the output end of the slave receiver 33 in the present invention, for the prevention of sensitivity of receiving the output signal of second television channel (S-out2) by the slave television being interfered by the local leakage 3220 of the master receiver 32. This local-oscillator leakage processing unit 40 is used for receiving an output signal of second television channel (S-out2) having the local leakage 3220 from the slave receiver 33, followed by detecting and removing the local leakage 3220 included in the output signal of second television channel (S-out2) by means of digital processing method, so as to provide an output signal of second television channel (S-out2') without local leakage noise to the slave television. In this case, the local leakage 3220 included in the output signal of second television channel (S-out2') may be detected and removed via the provision of local-oscillator leakage processing unit 40, for avoiding interference of the local leakage 3220 on sensitivity of receiving the output signal of second television channel (S-out2') by the slave television, and the effect on video quality of played output signal of second television channel (S-out2').

The local-oscillator leakage processing unit 40 described in the present invention is capable of detecting and removing the local leakage 3220 included in the output signal of second television channel (S-out2) by selectively adopting different digital processing methods. The adoptable digital processing method is described as follows.

Figure 4:
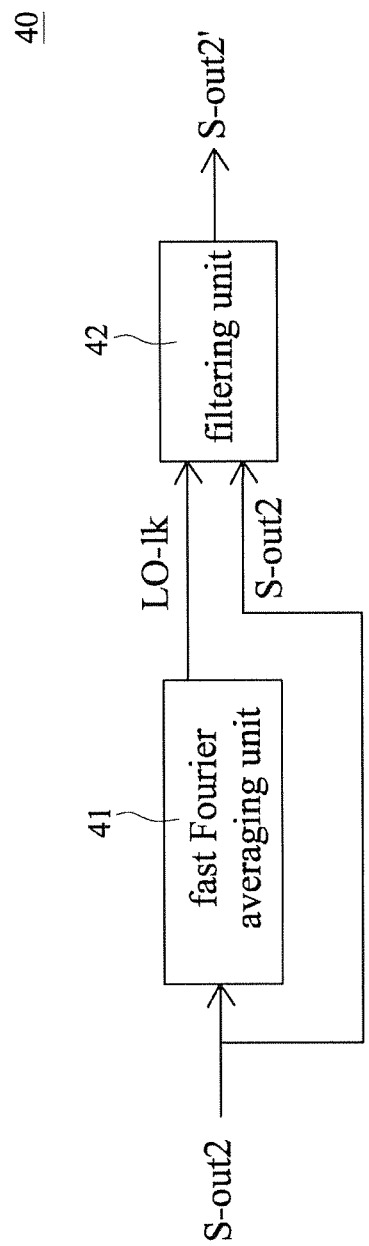
FIG. 4 is a structural diagram of the digital processing method of local-oscillator leakage processing unit according to a first embodiment of the present invention.

Referring to FIG. 4, there is shown a structural diagram of the local-oscillator leakage processing unit according to a first embodiment of the present invention. The local-oscillator leakage processing unit 40 of the present invention comprises a fast Fourier averaging unit 41 and a filtering unit 42, the filtering unit 42 being connected to the fast Fourier averaging unit 41.

The fast Fourier averaging unit 41 is used to receive an output signal of second television channel (S-out2) including the local leakage (LO-lk) from the slave receiver 33, followed by performing a Fourier transformation procedure to transform the output signal of second television channel (S-out2) including the local leakage (LO-lk) in time domain into that in frequency domain. Afterwards, an averaging procedure is further performed, such that the periodic output signal of second television channel (S-out2) may be cancelled out by averaging, to obtain the single-frequency local leakage (LO-lk) only.

The filtering unit 42 comprises a filter (such as, band rejection filter), used for receiving an output signal of second television channel (S-out2) including the local leakage (LO-lk) via the slave receiver 33, and acquiring frequency information of the local leakage (LO-lk) via the fast Fourier averaging unit 41. The filtering unit 42 is allowed to remove the signal at the frequency corresponding to local leakage (LO-lk) from the output signal of second television channel (S-out2) on the basis of the frequency information of local leakage (LO-lk), such that an output signal of second television channel (S-out2') without local leakage noise may be obtained.

Figure 5:
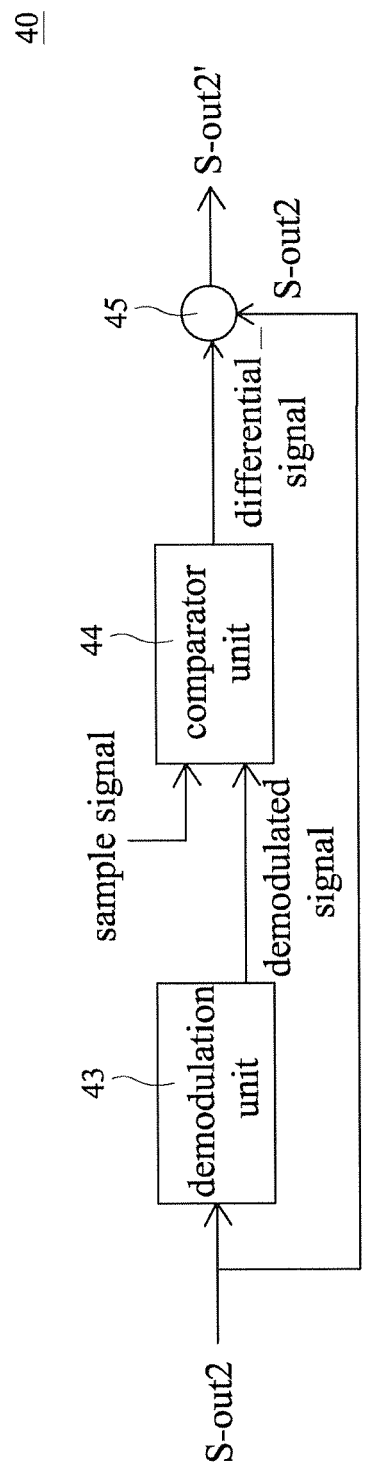
FIG. 5 is a structural diagram of the digital processing method of local-oscillator leakage processing unit according to a second embodiment of the present invention.

Referring to FIG. 5, there is shown a structural diagram of the local-oscillator leakage processing unit according to a second embodiment of the present invention. The local-oscillator leakage processing unit 40 of this embodiment comprises a demodulation unit 43, a comparator unit 44 and an adder 45, the comparator unit 44 being provided between the demodulation unit 43 and the adder 45.

The demodulation unit 43 is used for receiving an output signal of second television channel (S-out2) including the local leakage (LO-lk) from the slave receiver 33, followed by demodulating the output signal of second television channel (S-out2) including the local leakage (LO-lk), so as to generate a demodulated signal having local leakage.

The comparator unit 44 is provided with a sample signal, which is an idea-wave signal without local leakage noise and may be obtained by demodulating the output signal of second television channel (S-out2) without interference of local leakage. In the comparator unit 44, the demodulated signal is compared with the ideal sample signal, so as to generate a differential signal, which may be also the signal tone of local leakage (LO-lk).

The adder 45 is used for receiving an output signal of second television channel (S-out2) including the local leakage (LO-lk) via the slave receiver 33, and receiving the differential signal via the comparator unit 44. The differential signal is subtracted from the output signal of second television channel (S-out2) including the local leakage (LO-lk), so as to obtain an output signal of second television channel (S-out2') without local leakage noise.

Figure 6:
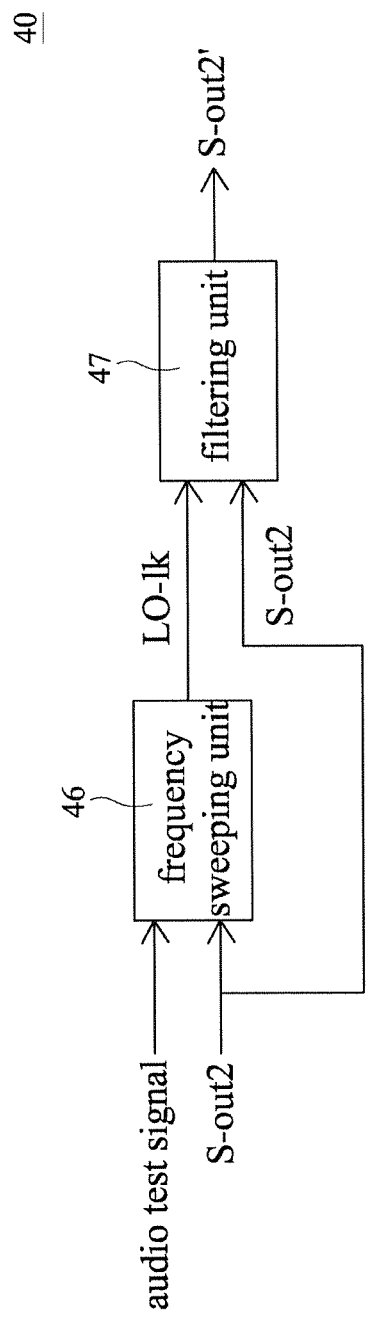
FIG. 6 is a structural diagram of the digital processing method of local-oscillator leakage processing unit according to a third embodiment of the present invention.

Referring to FIG. 6, there is shown a structural diagram of the local-oscillator leakage processing unit according to a third embodiment of the present invention. The local-oscillator leakage processing unit 40 of the present invention comprises a frequency sweeping unit 46 and a filtering unit 47, the filtering unit 47 being connected to the frequency sweeping unit 46.

The local-oscillator leakage processing unit 40 of this embodiment is provided with an audio test signal, which may be set referring to the first local oscillator source 322 correspondingly. The frequency sweeping unit 46 is used for receiving the output signal of second television channel (S-out2) including the local leakage (LO-lk) from the slave receiver 33, followed by frequency-sweeping the output signal of second television channel (S-out2) by the use of the audio test signal, thus obtaining a local leakage (LO-lk) matching with the audio test signal by frequency-sweeping the output signal of second television channel (S-out2).

In the filtering unit 47, the signal at the frequency corresponding to local leakage (LO-lk) is removed from the output signal of second television channel (S-out2) on the basis of frequency information obtained by frequency-sweeping the local leakage (LO-lk). Thus, an output signal of second television channel (S-out2') without local leakage noise is obtained.

Accordingly, the local-oscillator leakage processing unit 40 of the present invention is allowed for detecting and removing the local leakage 3220 of the master receiver 32 included in the output signal of second television channel (S-out2') by means of different digital processing methods, so as to avoid the local leakage 3220 to interfere the sensitivity of receiving the output signal of second television channel (S-out2') by the slave television. Naturally, the above three digital processing methods are only a part of embodiments of the local-oscillator leakage processing unit 40 in the present invention, and it should be understood by those skilled in the art that the local-oscillator leakage processing unit 40 of the present invention is not limited thereto.

Figure 7:
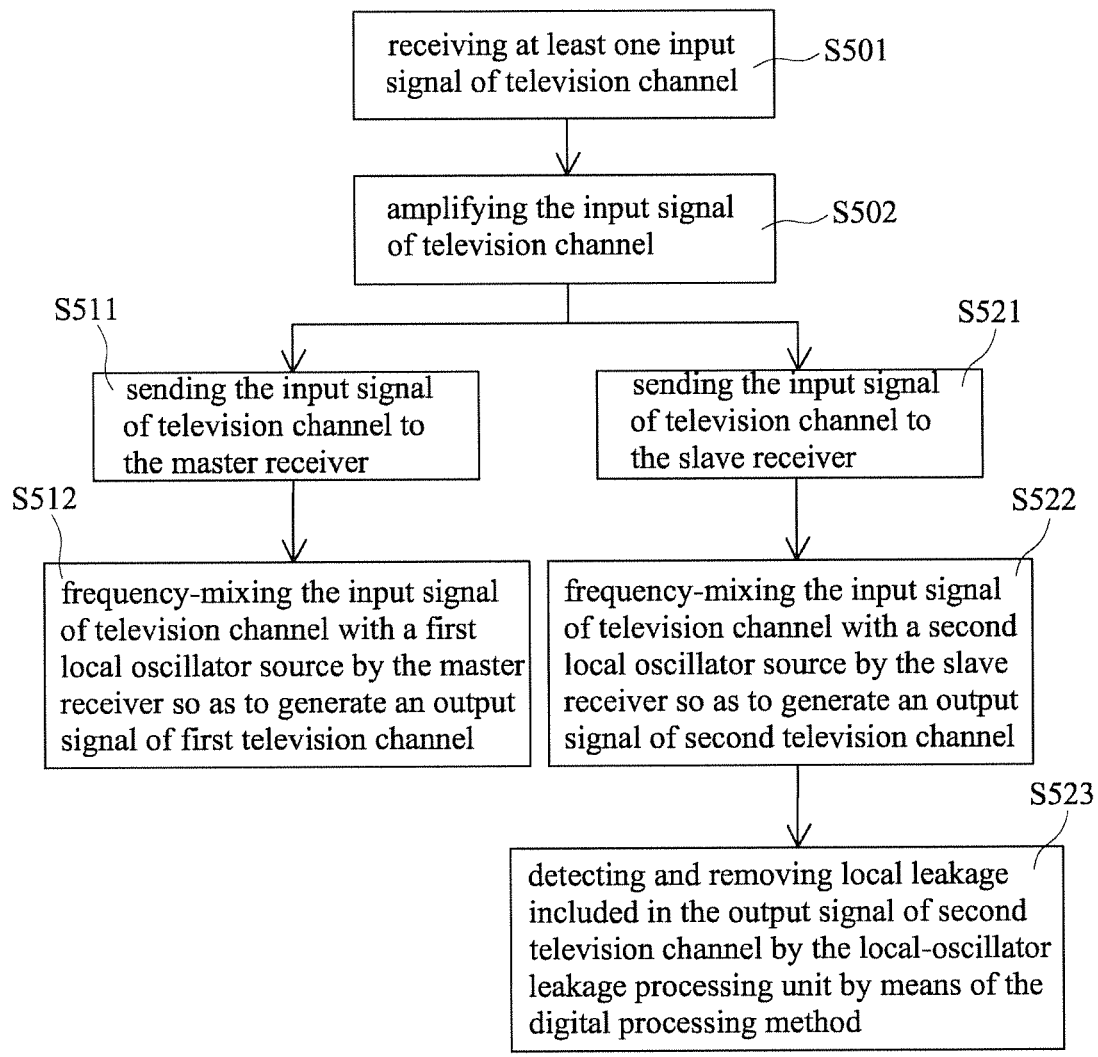
FIG. 7 is a flow chart of a method for reception of digital television signal according to one preferred embodiment of the present invention.

Referring to FIG. 7, there is shown a flow chart of a method for reception of digital television signal according to one preferred embodiment of the present invention. Firstly, referring to FIG. 2, step S501 is performed, such that at least one down-converted digital input signal of television channel (S-in) may be received by the chip 30 via the antenna 21 and the low-noise down converter 22, when the digital television signal reception system 300 of the present invention is operated.

In step S502, the low-noise amplifier 31 is used by the chip 30 to amplify the input signal of television channel (S-in). Subsequently, step S511 is performed to send the amplified input signal of television channel (S-in) to the master receiver 32. Alternatively, step S521 is performed to send the amplified input signal of television channel (S-in) to the slave receiver 33.

When the amplified input signal of television channel (S-in) is sent to the master receiver 32, step S512 is performed, in which the first frequency mixer 321 is used by the master receiver 32 to frequency-mix the input signal of television channel (S-in) with the first local oscillator source 322, so as to generate an output signal of first television channel (S-out1). Then, visual content of television program may be watched through the master television by playing the output signal of first television channel (S-out1).

Alternatively, when the amplified input signal of television channel (S-in) is sent to the slave receiver 33, step S522 is performed, in which the second frequency mixer 331 is used by the slave receiver 33 to frequency-mix the input signal of television channel (S-in) with the second local oscillator source 332, so as to generate an output signal of second television channel (S-out2) to be sent to the local-oscillator leakage processing unit 40.

Subsequently, in step S523, different digital processing methods are selectively adopted by the local-oscillator leakage processing unit 40 for detecting and removing the local leakage 3220 of the master receiver 32 included in the output signal of second television channel (S-out2). Processing steps of various digital processing methods are described respectively as follows.

Referring to FIG. 4, the processing steps of a first digital processing method comprise: performing a Fourier transformation procedure by the fast Fourier averaging unit 41 so as to transform the output signal of second television channel (S-out2) including local leakage (LO-lk) in time domain into that in frequency domain, afterwards, further performing an averaging procedure so as to cancel out the output signal of second television channel (S-out2) by averaging and then obtaining the local leakage (LO-lk) only; subsequently, removing the signal at the frequency corresponding to local leakage (LO-lk) from the output signal of second television channel (S-out2) by the filtering unit 42 on the basis of the frequency information of local leakage (LO-lk), such that an output signal of second television channel (S-out2') without local leakage noise may be obtained.

Additionally, referring to FIG. 5, the processing steps of a second digital processing method comprise: demodulating the output signal of second television channel (S-out2) including the local leakage (LO-lk) by the demodulation unit 43 so as to generate a demodulated signal having local leakage; afterwards, comparing the demodulated signal with the ideal sample signal by the comparator unit 44 so as to generate a differential signal; subsequently, subtracting the differential signal from the output signal of second television channel (S-out2) including the local leakage (LO-lk) by the adder 45, thus allowing to obtain an output signal of second television channel (S-out2') without local leakage noise.

Further, referring to FIG. 6, the processing steps of a third digital processing method comprise: using an audio test signal by the frequency sweeping unit 46 to frequency-sweep the output signal of second television channel (S-out2), so as to obtain a local leakage (LO-lk) matching with the audio test signal by frequency-sweeping the output signal of second television channel (S-out2); subsequently, removing the signal at the frequency corresponding to local leakage (LO-lk) from the output signal of second television channel (S-out2) on the basis of frequency information obtained by frequency-sweeping the local leakage (LO-lk), thus obtaining an output signal of second television channel (S-out2') without local leakage noise.

After above digital processing procedures, an output signal of second television channel (S-out2') without local leakage noise may be received by the slave television, and visual content of television program is watched by playing the output signal of second television channel (S-out2').

Naturally, there are still various embodiments for the present invention. It should be understood that various changes and alterations could be made to the present invention by those skilled in the art without departing from the spirit and scope of the invention, and included within the scope of the appended claims.

The invention claimed is:

1. A method for reception of digital television signal applied in a digital television signal reception system, said digital television signal reception system including a chip having a low-noise amplifier and a master receiver, at least one slave receiver, and at least one local-oscillator leakage processing unit, the method comprising:
    receiving at least one digital input signal of television channel at said chip;
    amplifying said input signal of television channel via said low-noise amplifier;
    sending said amplified input signal of television channel to said master receiver and said slave receiver;
    frequency-mixing said amplified input signal of television channel with a signal of a first local oscillator source provided by said master receiver to generate an output signal of first television channel;
    frequency-mixing said amplified input signal of television channel with a signal of a second local oscillator source provided by said slave receiver separate from said first local oscillator source, to generate an output signal of second television channel, wherein a frequency associated with said second local oscillator source is different from a frequency associated with said first local oscillator source; and
    executing a digital process in a local-oscillator leakage processing unit to detect and remove from said output signal of second television channel generated by said slave receiver a local-oscillator leakage effect due to said first local oscillator source of said master receiver.

2. The method for reception of digital television signal according to claim 1, wherein said digital processing method further comprises:
    performing a Fourier Transformation procedure, so as to transform said output signal of second television channel including local leakage in time domain into that in frequency domain;
    performing an averaging procedure, so as to cancel out said output signal of second television channel by averaging to obtain said local leakage only; and
    performing a filtering procedure on said output signal of second television channel on the basis of frequency information of said local leakage, so as to remove said local leakage from said output signal of second television channel.

3. The method for reception of digital television signal according to claim 1, wherein said digital processing method further comprises:
    demodulating said output signal of second television channel including local leakage, so as to generate a demodulated signal;
    comparing said demodulated signal with a sample signal, so as to generate a differential signal; and
    subtracting said differential signal from said input signal of television channel, such that said local leakage is removed from said output signal of second television channel.

4. The method for reception of digital television signal according to claim 1, wherein said digital processing method further comprises:
    setting an audio test signal;

frequency-sweeping said output signal of second television channel by means of said audio test signal, so as to obtain said local-oscillator leakage matching with said audio test signal; and
performing a filtering procedure on said output signal of second television channel on the basis of frequency information of said local leakage, so as to remove said local leakage from said output signal of second television channel.

5. A digital television signal reception system, comprising:
a chip used for receiving at least one digital input signal of television channel, said chip including:
   a low-noise amplifier used for amplifying said input signal of television channel; and
   a master receiver connected to an output end of said low-noise amplifier, said master receiver including a first frequency mixer for frequency-mixing said amplified input signal of television channel with a signal of a first local oscillator source to generate an output signal of first television channel;
at least one slave receiver connected to the output end of said low-noise amplifier, said slave receiver including a second frequency mixer for frequency-mixing said amplified input signal of television channel with a signal of a second local oscillator source separate from said first local oscillator source to generate an output signal of second television channel, wherein a frequency associated with said second local oscillator source is different from a frequency associated with said first local oscillator source; and
at least one local-oscillator leakage processing unit connected to said slave receiver for detecting and removing from said output signal of second television channel generated by said slave receiver a local-oscillator leakage effect due to said first local oscillator source of said master receiver.

6. The digital television signal reception system according to claim 5, wherein said local-oscillator leakage processing unit includes:
   a fast Fourier averaging unit, receiving said output signal of second television channel including said local leakage from said slave receiver, performing a Fourier Transformation procedure so as to transform said output signal of second television channel including said local leakage in time domain into that in frequency domain, further performing an averaging procedure so as to cancel out said output signal of second television channel by averaging to obtain said local leakage only; and
   a filtering unit, connected to said fast Fourier averaging unit and said slave receiver, for receiving said output signal of second television channel including said local leakage via said slave receiver, as well as obtaining said local leakage via said fast Fourier averaging unit, performing a filtering procedure on said output signal of second television channel on the basis of frequency information of said local leakage so as to remove said local leakage from said output signal of second television channel.

7. The digital television signal reception system according to claim 5, wherein said local-oscillator leakage processing unit includes:
   a demodulation unit, receiving said output signal of second television channel including said local leakage via said slave receiver, demodulating said output signal of second television channel including said local leakage so as to generate a demodulated signal;
   a comparator unit, connected to said demodulation unit, being provided with a sample signal, comparing said demodulated signal with said sample signal to generate a differential signal; and
   an adder, connected to said comparator unit and said slave receiver, receiving said output signal of second television channel including said local leakage via said slave receiver and obtaining said differential signal via said comparator unit, subtracting said differential signal from said output signal of second television channel including said local leakage such that said local leakage is removed from said output signal of second television channel.

8. The digital television signal reception system according to claim 5, wherein said local-oscillator leakage processing unit includes:
   a frequency-sweeping unit, receiving said output signal of second television channel including said local leakage via said slave receiver, setting an audio test signal, frequency-sweeping said output signal of second television channel by means of said audio test signal so as to obtain said local leakage matching with said audio test signal from said output signal of second television channel; and
   a filtering unit, connected to said frequency-sweeping unit and said slave receiver, receiving said output signal of second television channel including said local leakage via said slave receiver and obtaining said local leakage via said frequency-sweeping unit, performing a filtering procedure on said output signal of second television channel on the basis of frequency information of said local leakage, so as to remove said local leakage from said output signal of second television channel.

9. The digital television signal reception system according to claim 5, wherein said local-oscillator leakage of said master receiver is leaked to said low-noise amplifier and said slave receiver from said master receiver.

10. The digital television signal reception system according to claim 5, wherein said digital input signal of television channel is a signal conforming to DVB-S, ATSC, ISDB-S, or other digital television broadcast standards.

* * * * *